Feb. 26, 1963   D. G. FAWKES   3,079,124
ROTARY VALVE
Filed Dec. 23, 1959   3 Sheets-Sheet 1

Inventor:
Donald G. Fawkes
By: Hofgren, Brady, Wegner,
Allen & Stellman
Attorneys Feb. 26, 1963　　　D. G. FAWKES　　　3,079,124
ROTARY VALVE
Filed Dec. 23, 1959　　　　　　　　　　3 Sheets-Sheet 2
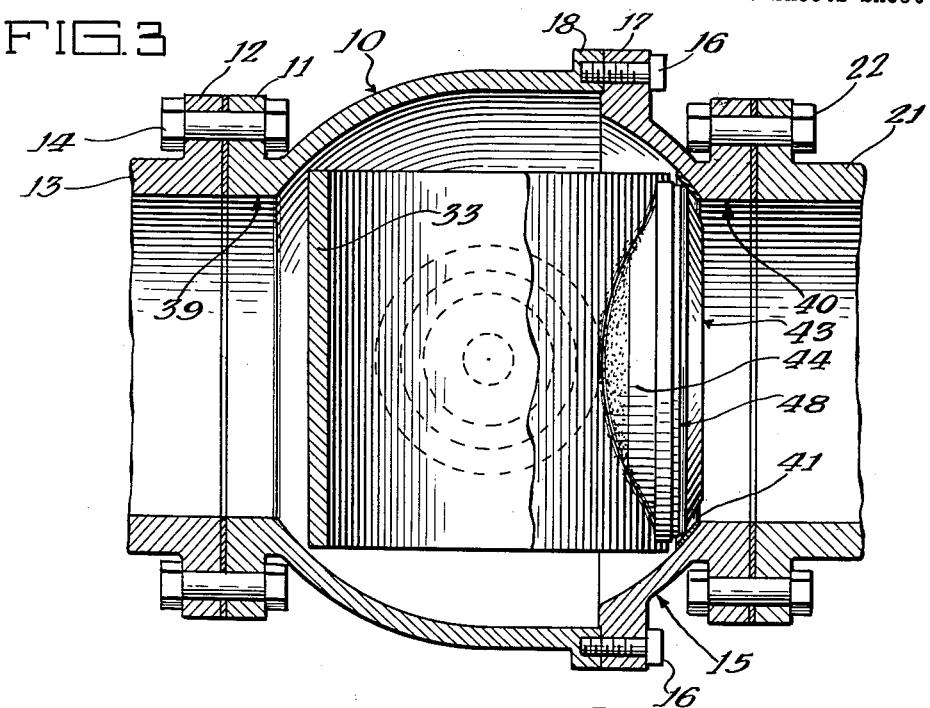
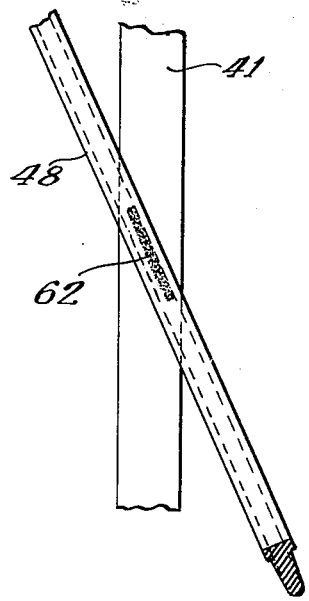
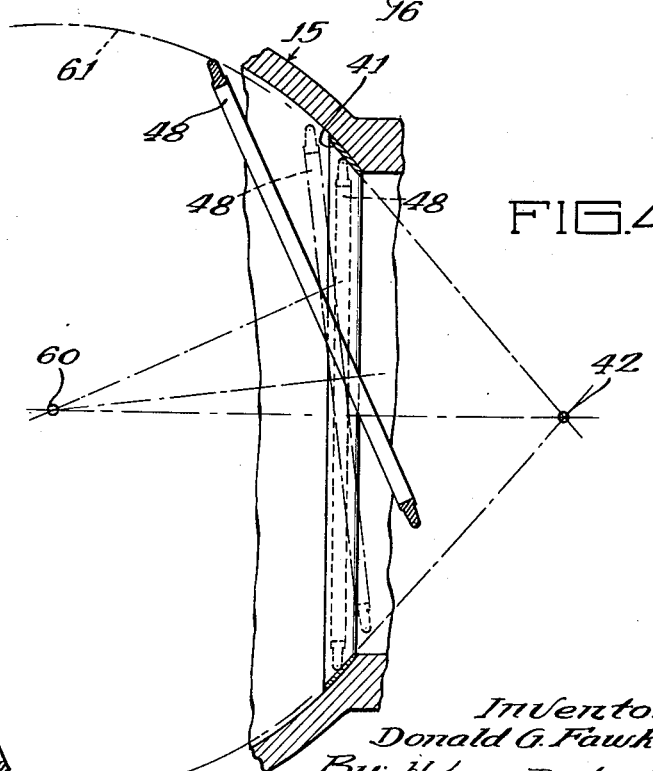
Inventor:
Donald G. Fawkes
By: Hofgren, Brady, Wegner,
Allen & Stellman
Attorneys Feb. 26, 1963
D. G. FAWKES
3,079,124
ROTARY VALVE
Filed Dec. 23, 1959
3 Sheets-Sheet 3
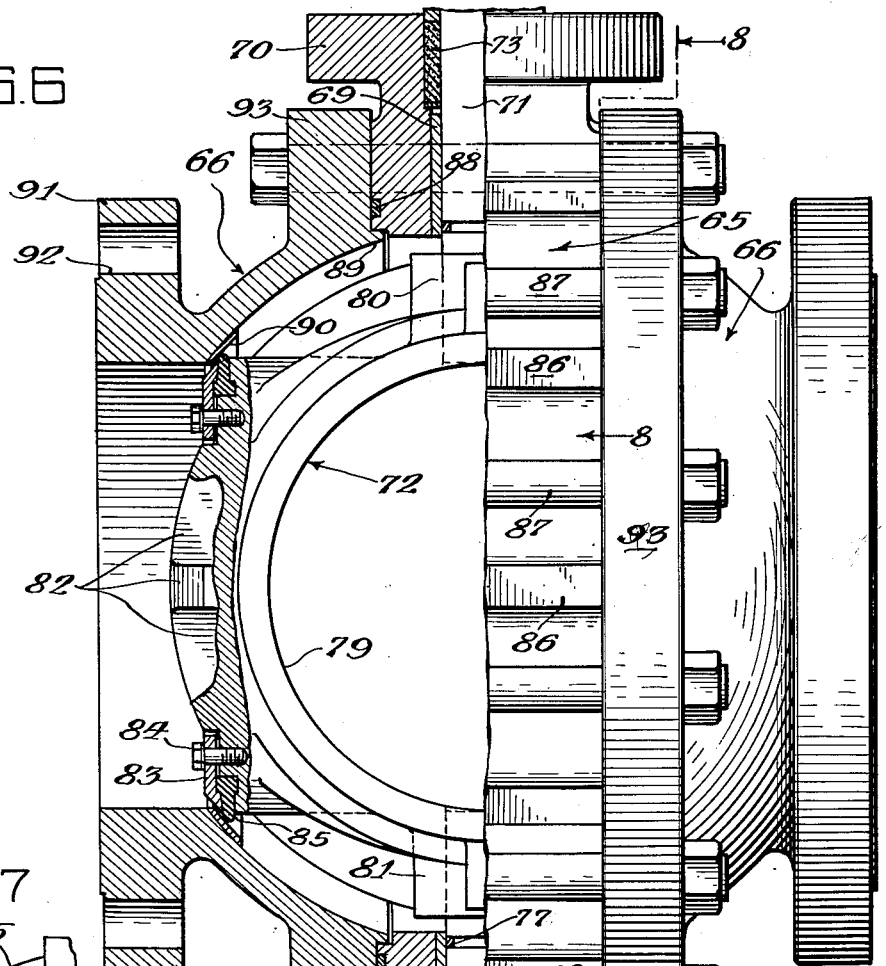
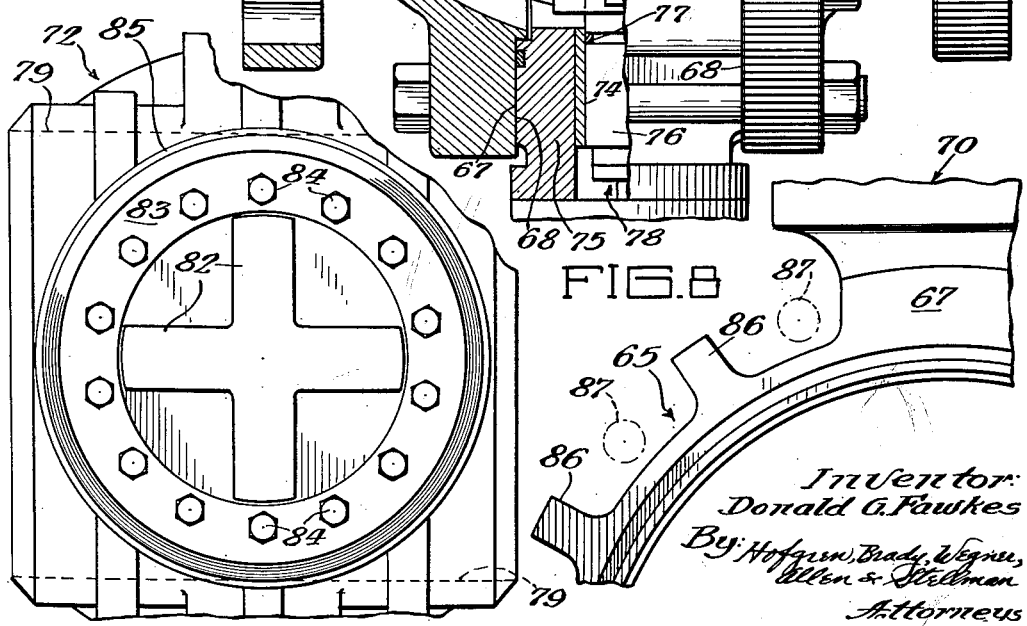
Inventor:
Donald G. Fawkes
By Hofgren, Brady, Wegner,
Allen & Stellman
Attorneys

United States Patent Office 3,079,124
Patented Feb. 26, 1963

3,079,124
ROTARY VALVE
Donald G. Fawkes, Chicago, Ill., assignor to Henry
Pratt Company, a corporation of Illinois
Filed Dec. 23, 1959, Ser. No. 861,545
6 Claims. (Cl. 251—317)

This invention relates to a class of valves which may be termed rotary, spherical or ball valves in which the rotor of the valve has a pipe-like section for alignment with an inlet and outlet for substantially unrestricted flow through the valve.

The principal object of this invention is to provide a new and improved valve of the above character.

Another and very significant object of this invention is to provide a rotary valve in which the housing, seats, rotor and its bearings are all constructed about a common center and are thus easily and economically manufactured. Additionally, the centered nature of the valve parts also provides a valve capable of exceedingly long life with continued effective operation.

Another object is to provide such a rotary valve with an effective closure including a resilient closure member which is carried along a spherical path generally tangent to and in slight interference with a conical surface when adjusted for tightness, a part of the conical surface defining the valve seat.

Another object is to provide a valve closure including an annular resilient rubber-like member which may move on to a metallic valve seat progressively along the length of the rubber member, insuring its proper operation over years of effective operation of the valve.

A further object is to provide a rotary valve in which the housing is constructed in assembled parts insuring proper cooperation of a rotor and valve seats while simplifying manufacture and accurate assembly of the valve.

Other objects, features and advantages of the present invention will be apparent from the following description of a valve embodying the invention and as illustrated in the accompanying drawings, in which:

FIGURE 3 is a fragmentary sectional view at right angles to FIGURE 1 and taken substantially along line 3—3 therein;

FIGURE 4 is a diagrammatic line illustration of the operation of the valve showing the resilient closure member and its relation to the valve seat in various positions;

FIGURE 5 is an enlarged diagrammatic view of the area of contact between the closure and its seat as illustrated in FIGURE 4;

FIGURE 6 is an elevational view in half section illustrating a preferred valve housing and employing the valve closure means shown in FIGURES 4 and 5;

FIGURE 7 is a broken elevational view of the rotor of the valve shown in FIGURE 6 removed from the housing and looking toward the closure member on the rotor, and FIGURE 8 is a fragmentary elevational view of the central section of the valve housing shown in FIGURE 6, removed from the assembly and taken 90° to the view of FIGURE 6, substantially along line 8—8 in FIGURE 6.

The type of valve to which the present invention is applicable has been called by various names such as spherical, ball or more generically as rotary valves.

Basically, the valve has a housing with appropriate flanges for connection to adjoining piping. The housing is, in general, the shape of a ball so that it has a large interior open space. A rotor is mounted within the valve housing and has a pipe-like section which can be turned into alignment with the inlet and outlet to provide a straight-through, unobstructed passage for fluid flow through the valve. The valve is particularly advantageous in that the pipe-like section of the rotor guides the flow through the valve in such a manner that there is very little, if any, disturbance to the smooth lines of flow. The closure of the valve is generally accomplished by mounting a closure member on the side of the rotor so positioned as to be carried across the inlet or outlet when the rotor is turned 90° within the housing. The valves with which the present invention is concerned should be distinguished also from plug valves which have a spherical cavity in which a sphere is mounted for generally contiguous contact with the cavity. In the present type of valves, the rotor is supported at opposite trunnions and is otherwise free of contact with the housing.

Figure 1:
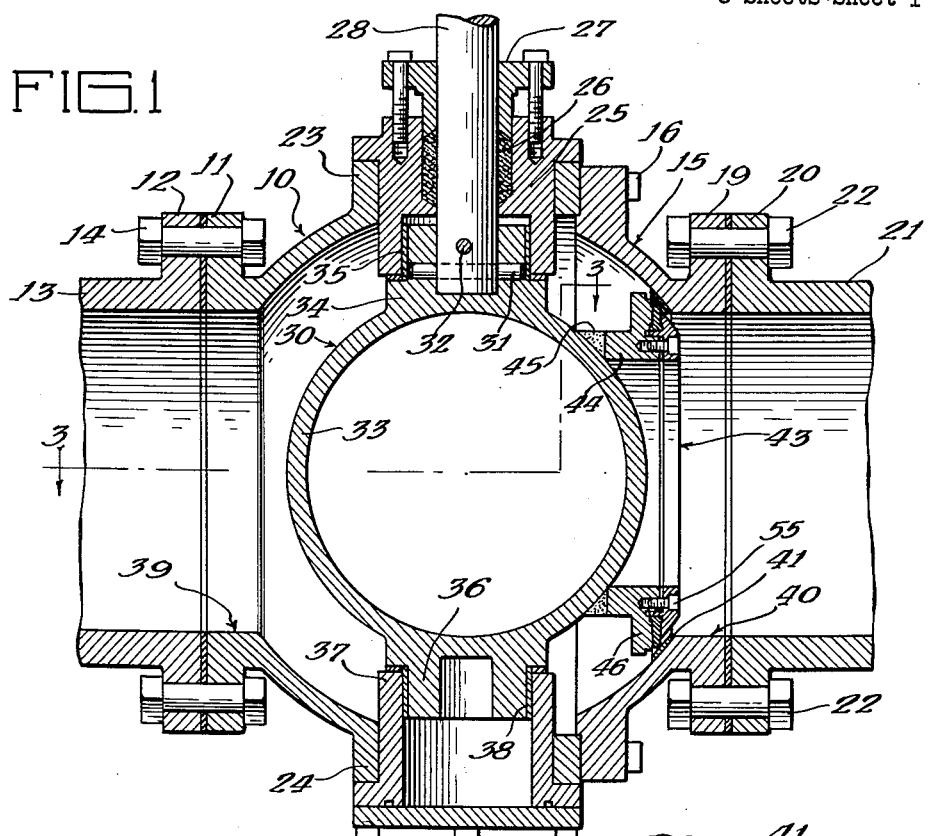
FIGURE 1 is a sectional view through the center of a valve embodying the invention, the valve being shown diagrammatically installed between pipe-line sections shown fragmentarily.
Figure 2:
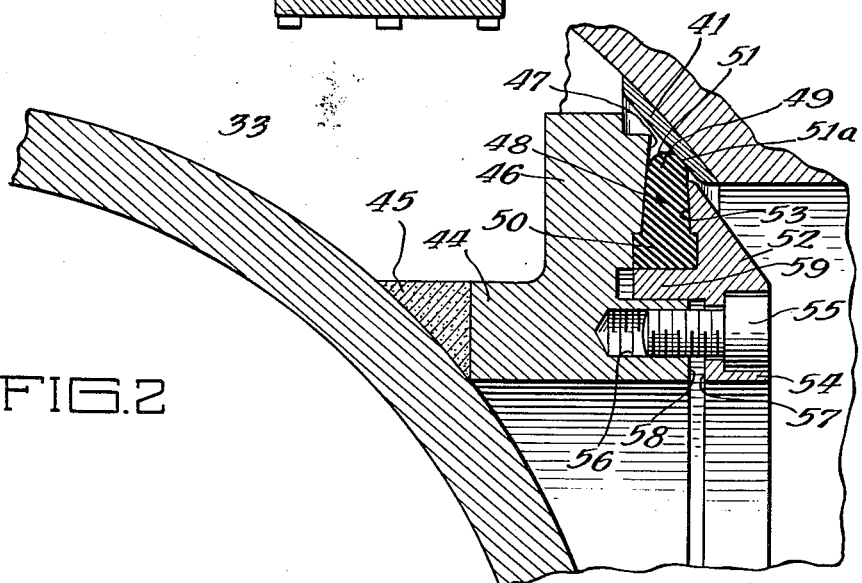
FIGURE 2 is an enlarged fragmentary sectional view through a portion of the valve closure and valve seat in the position shown in FIGURE 1.

A relatively small size of valve has been chosen for illustrating the present invention in FIGURES 1 to 3, and the drawings illustrate a valve for use in a nominal 10" line. Referring to FIGURES 1 and 3, the housing of the valve is in two parts; the main part 10 having a flange 11 for connection to a flange 12 of an adjoining pipe 13 by appropriate bolts 14. The main part of the housing extends beyond the center of the valve for connection to the second part 15 of the housing, the parts 10 and 15 being connected by machine screws 16 passing through appropriate flanges 17 and 18 formed on their respective valve housing portions. The smaller valve housing portion 15 also has a flange 19 whereby connection may be made to the flange 20 of a pipe 21 by bolts 22.

The main portion of the housing 10 is provided at diametrically opposite points with flanges 23 and 24, both of circular form for receiving a bearing sleeve. At the upper end of the housing (FIGURE 1) a bearing sleeve 25 fits within the circular flange 23 and has provision for a seal 26 and stuffing box 27 to accommodate a shaft 28. This shaft is the operating shaft of the valve and is intended to be secured to the rotor 30 as by pins 31 and 32. The rotor has a pipe-like elongated section 33 equipped with an upper boss bearing 34 extending upwardly into the upper sleeve 25 with appropriate bearing metal sleeve 35 between the two parts. A lower boss member 36 extends downwardly from the lower part of the rotor 33 and is received in a bearing sleeve 37 mounted in the lower circular flange 34 of the housing. Here also an appropriate bearing metal sleeve 38 is interposed between the boss 36 and the sleeve 37.

The structure of the valve housing and rotor thus described is such that the pipe-like section may be aligned with the inlet 39 (FIGURE 3) and the outlet 40, both of which are of the same size as the connected piping. The pipe-like section has a diameter which is the same as the inlet and the outlet and only a small gap will extend between the ends of the rotor and the housing parts which form the inlet and outlet. Very little, if any, disturbance to flow lines occurs because of this small gap.

The closure of the present valve is effected by rotating the rotor 90° to bring a closure mounted on the side of the rotor into contiguous contact with a valve seat formed in the housing. Referring to FIGURES 1 and 3, the smaller section 15 of the valve housing is provided with a ring 41 of stainless steel or other metal forming a valve seat. The ring 41 may be laid in the cast metal housing section 15 and then finished with a smooth outer surface. The surface in the present valve is part of a conical surface, the center 42 of which (FIGURE 4) is on a center line through the inlet and outlet of the valve housing. The closure of the valve is a ring of resilient material intended to seat upon the valve seat 41 just described. The closure generally designated 43 has a base ring 44 shaped to fit the cylindrical surface of the pipe-like section 33, and is welded thereto. In FIGURE 1, it will be noted that the ring 44 is secured as by welding 45 to the side of the pipe-like section 33.

The exact form of the closure structure may be understood by the details shown in FIGURE 2. The ring 44 has a radially outwardly extending flange 46 with an outer exposed surface 47 shaped to support a resilient rubber-like ring 48 along one side of its radially extending lip 49 integral with an enlarged base 50. The outer end surface 51 of the ring is rounded so that the surface is formed in the shape of the outer part of a torus. A metal retaining ring 52 has an inner surface 53 shaped to seat against the outer part of the sealing ring 48 and extends inwardly with a flange 54 to receive machine screws 55 threaded in tapped bores 56 in the ring 44. Sufficient clearance is provided between the inner surface 57 of the ring and the outer surface 58 of the base ring 44 such that the clamping ring may be adjusted in position relative to the base ring. An axially extending flange part 59 on the clamping ring extends beneath the base of the resilient sealing member. The parts are clamped together in such a manner that a static seal is formed on the resilient ring part against its mating metal parts. The base ring 44, being welded to the side of the pipe-like section together with the static seal so-formed, prevents any leakage through the parts of the closure.

The circular parts of the closure 43 being mounted on the rotor at a distance from its center line of rotation will describe the surface of a sphere in moving between the open and closed positions. It will be noted in FIGURE 2 that the metal parts of the closure are so proportioned that they have no contact with the seat material 41. During opening and closing movement of the rotor, there is no metal-to-metal contact between the rotor and any part of the housing. The rotor may turn in its bearings and only the rubber material of the seal 48 will come in contact with the seat. Generally, the resilient ring 48 has a rounded nose whose outer surface 51 is tangent to the flat seat surface formed on the housing. It may be described by saying that the sphere defined by the outer surface of the nose is tangent to the conical surface of the seat. In FIGURE 2 a flattened portion 51a of the nose is in sealing contact with the flat surface of the seat. The initial position of the rubber ring on the rotor is such that the contact between the rounded nose and the conical seat surface is a circular line of contact when the valve is fully closed. An adjustment is made by tightening the machine screws 55 to expand the rubber ring against the conical seat surface to broaden the line contact mentioned into a surface which will straddle the circular line of contact specified above. In so constructing the cooperating parts of the closure, a minimum amount of interference between the rubber ring and conical seat surface will be obtained. In the valve shown, this sealing occurs on the downstream side of the valve but will be effective against fluid flow in either direction.

The operation of the valve may best be understood by referring to FIGURE 4. The center 60 represents the intersection of a line through the inlet and outlet of the valve and a line normal thereto being the axis of rotation of the rotor. The center 42 is the apex of a cone on the center line through the inlet and outlet, and including the surface of seat 41. The dotted line position of the resilient ring 48 shows the ring in complete 360° of contact with the seat. The condition of the nose of the ring will be as is illustrated in FIGURE 2. The diagrammatic illustration of FIGURE 4 indicates the manner in which the resilient ring is brought into contact with the seat material.

When the rotor is first rotated from closed and started toward open position, the resilient ring will move toward the position shown in dot and dash lines and progressively will move along the surface of an imaginary sphere 61 toward the full line position illustrated. During all of this movement, a portion of the nose of the ring remains in sliding contact with the conical shaped seat. In the full line position, a stippled portion 62 (FIGURE 5) of the resilient ring extends across and is in contact with the seat. As the rotor moves, the area of contact progressively moves lengthwise of the resilient ring. The ring has two areas 62, one on either side, which are in contact with the seat. These areas move toward each other and will merge just prior to movement of the ring out of contact with the seat entirely.

As a further explanation of how the closure moves on to the metal seat, the entire resilient member is out of contact with the seat when the valve is open. The initial movement of the rotor will bring the edge of the resilient ring against the seat gradually, compressing the rubber material to the extent that it will be compressed when the valve is closed. The part of the ring which first contacted the seat moves across the seat and beyond, leaving two separate areas of contact between the ring and seat. These areas travel lengthwise of the ring until the ring is brought into continuous contact with the seat, as illustrated in FIGURE 4. The gradual movement of the resilient member on to the seat has provided a means for centering all parts of the valve and yet obtaining a tight closure while prolonging the life of the resilient sealing ring. Many opening and closing cycles with the valve body being subjected to pressure after each closing of the valve, have proved the effectiveness of the present construction.

The operation of the valve closure, as described above, is the same whether the valve housing is formed as shown in FIGURES 1 thru 3, or whether it is constructed in the preferred manner shown in FIGURES 6, 7 and 8. A simplified construction of the parts of the valve housing permits a very accurate forming of the same so that accurate assembly of the valve assembly is made quite easy. Referring to FIGURES 6 thru 8, the housing for the valve preferably includes a generally annular central housing part 65 to which is attached a pair of annular housing parts 66 which are identical and reversible. The central part of the housing is a thin wafer-like valve housing member having accurately ground side faces 67 against which accurately ground surfaces 68 on the side parts are intended to seat. The central part of the valve housing carries a bearing sleeve 69 in an upper flanged boss 70 receiving a stub shaft 71 connected to a valve rotor 72. A packing 73 about the shaft seals against leakage from the interior of the valve around the operating shaft. A similar bearing sleeve 74 is provided in a lower boss 75 on the central housing part. A stub shaft 76 is mounted in the bearing sleeve and an O-ring 77 seals against fluid leakage therealong. The lower stub shaft may include mechanism 78 forming an adjustable thrust bearing for supporting the weight of the rotor within the valve housing The advantage of the preferred housing construction is that the center wafer section of the housing may be assembled with the rotor in place prior to attachment of the rest of the valve housing and obviously the parts of the rotor are easily accessible for assembly during this operation. The rotor 72 is preferably a cast member in which the pipe section 79 is an integral casting having bosses 80 and 81 diametrically opposite for receiving the shafts 71 and 76. The closure on the rotor is best seen in FIGURES 6 and 7 and includes a built-up section with ribs 82 and a circular area to which the rubber ring retaining plate 83 is attached as by bolts 84. The sealing ring 85 is of the same shape and assembled in the same manner as described and illustrated in detail in FIGURE 2.

When the assembly of the central housing section and the rotor is completed, the valve may be completed by the mere attachment of the side sections 66. The central section has cross ribs 86 with intervening open spaces between them for the passage of bolts 87 out of contact with the central section. The end sections 66 are secured to the central section by the bolts 87, in effect, straddling the central section through the spaces between the ribs 86. The mating surfaces between the housing sections are accurately ground to provide accurate location of the side housing sections on the central section. A sealing ring in the nature of an O-ring 88 is provided between each of the housing sections insuring a liquid-tight seal. The side sections are provided with a small flange 89 fitting within the central opening in the central section and accurate locating of the side sections concentrically with the central section. The mere attachment of the side sections to the central part of the housing thus accurately locates the conical valve closure seats 90 relative to the axis of the rotor and centrally on the center line through the inlet and outlet of the housing.

In the preferred form, each of the side sections of the valve housing may be equipped with any desired mating flanges for installing the valve in existing piping. In the present illustration, the outer flanges 91 are provided with bolt holes 92 in conventional form for bolted flange piping. Preferably, the side sections are made with a flange 93 to receive the bolts 87 and as will be observed from the drawings, the head and nuts on bolts 87 are easily accessible for assembly purposes. The flanges 89 and 93 are circular as are the surfaces on the central section with which they mate. Some slight movement circumferentially of the end housing sections 66 relative to the central section 65 may be tolerated as it can have no effect on the location of the valve seat 90 relative to the axis of the rotor or the centerline through the valve. After bolts 87 are tightened to finish the valve assembly, no movement should occur between the sections of the housing. While the sections 66 have been described as identical, obviously only one need be equipped with the valve seat inlay 90. Both sections are identically cast members in all other respects.

The foregoing detailed description has been given for clearness of understanding only, and no unnecessary limitations are to be understood therefrom for some modifications will be obvious to those skilled in the art.

I claim:

1. A rotary valve, comprising: a housing having inlet and outlet on a center line therethrough; a rotor within the housing centered on said center line, shaft and bearings in said housing supporting said rotor on said center line and for rotation through generally 90° about an axis normal to and intersecting the center line; a closure member carried by the rotor and describing a spherical surface upon movement of the rotor; a valve seat about one of said inlet and outlet and being a portion of a conical surface centered on said housing center line and tangent to said spherical surface, said closure member carrying a resilient ring having an outer surface lying on said spherical surface and movable onto said conical surface of said valve seat to close said valve.

2. A rotary valve, comprising: a housing having a center line for alignment with connecting piping and an inlet and outlet centered on said center line; a rotor having trunnions supporting the same in said housing on said center line, said trunnions having an axis normal to and intersecting said center line; a closure disc carried on said rotor and having a resilient ring outermost thereon; a metallic valve seat about one of said outlet and inlet, said seat being a portion of a conical surface centered on said center line and tangent to a sphere described by movement of said resilient ring, said resilient ring having an outer surface lying on said sphere to engage said seat during opening and closing movement of said rotor and seating against said seat throughout 360° when closed.

3. A rotary valve, comprising: a housing having spaced inlet and outlet openings on a common center line therethrough; a rotor having a pipe-like section for alignment with said openings, said rotor being mounted for about 90° movement about an axis fixed in position normal to and intersecting said center line; a closure secured on one side of said rotor so that movement of the rotor carries the closure toward and away from one of said openings and describes a spherical surface having its center coincident with the intersection of said center line and axis; a metallic valve seat about said one opening and being a portion of a conical surface centered on said center line and tangent to said spherical surface, said rotor closure including a ring of resilient material sealed thereto with an outwardly projecting nose portion with the outer surface thereof being on said spherical surface to tangentially engage said valve seat in liquid-tight sealing engagement.

4. A rotary valve, comprising: a housing having a pair of spaced openings respectively forming an inlet and an outlet in the housing on a longitudinal center line through the valve; a metal valve seat about one of said openings and being a portion of a conical surface concentric with said one opening and said center line; a rotatable rotor mounted in the housing for rotation about a fixed axis and having a pipe-like section for alignment with said openings to open the valve, a closure member on the rotor for extending across said one opening to close the valve, said closure member including a resilient ring positioned on the rotor outwardly of the fixed axis of rotor rotation to sweep its outer surface in contact tangentially with said valve seat during movement of the rotor, said ring being positioned on the rotor to have areas of contact with the seat during opening and closing and being in 360° sealing contact with said seat when the valve is closed.

5. A rotary valve as specified in claim 4 wherein the rotor may rotate generally 90° and said closure member outer surface describes the surface of a sphere during such movement, said valve seat being generally tangent to said sphere and said resilient ring having an outer portion on the surface of said sphere to tangentially engage said seat.

6. A rotary valve, comprising: a hollow housing having spaced openings on a center line through the housing forming an inlet and an outlet; a rotor in the housing mounted for about 90° of rotation about an axis fixed in position normal to and intersecting said center line, said rotor having a pipe-like section for alignment with said openings to provide unobstructed and unrestricted flow through the housing; a closure mounted on said rotor for movement to a position across one of the openings to close the valve, said closure including a ring of resilient material secured in liquid-tight fashion to and in fixed position on the rotor and having an outer nose portion rounded in section; metal rings supporting said resilient ring on said rotor; a valve seat about said one opening and being a portion of a conical surface centered on and concentric with said valve housing center line, said rounded nose portion of said resilient ring having an outer surface positioned outwardly of said rotor rotation axis to sweep in sealing contact generally tangent with said valve seat through less than 360° during rotary motion of said rotor and to sealingly engage said seat through 360° with said outer surface generally tangent to said conical seat when the rotor is brought to closed valve position.

References Cited in the file of this patent

UNITED STATES PATENTS

| 2,663,538 | Bacchi | Dec. 22, 1953 |
| 2,809,011 | Davis | Oct. 8, 1957 |
| 2,945,669 | Gallagher | July 19, 1960 |

FOREIGN PATENTS

| 140,041 | Sweden | Jan. 18, 1949 |
| 261,470 | Italy | Nov. 28, 1928 |
| 567,554 | Canada | Dec. 16, 1958 |